United States Patent [19]

Kobayashi

[11] Patent Number: 4,545,031

[45] Date of Patent: Oct. 1, 1985

[54] PHOTO-ELECTRIC APPARATUS FOR MONITORING PRINTED PAPERS

[75] Inventor: Nobuki Kobayashi, Tokyo, Japan

[73] Assignee: Kita Electrics Co., Ltd., Tokyo, Japan

[21] Appl. No.: 417,282

[22] Filed: Sep. 13, 1982

[30] Foreign Application Priority Data

| | | | |
|---|---|---|---|
| Sep. 17, 1981 | [JP] | Japan | 56-145551 |
| Sep. 17, 1981 | [JP] | Japan | 56-145552 |
| Dec. 7, 1981 | [JP] | Japan | 56-195548 |
| Feb. 16, 1982 | [JP] | Japan | 57-22033 |

[51] Int. Cl.[4] ........ G06F 15/20

[52] U.S. Cl. ........ 364/900; 271/227; 355/3 SH; 364/471; 377/8

[58] Field of Search ... 364/200 MS File, 900 MS File, 364/518, 552, 469, 471, 562, 519-523; 371/20, 25, 29; 271/227, 228; 355/3 SH, 14 SH, 14 C, 14 CU; 358/256, 282; 377/3, 8, 12, 17, 39; 382/18, 22, 30, 34, 51

[56] References Cited

U.S. PATENT DOCUMENTS

| | | | |
|---|---|---|---|
| 4,225,885 | 9/1980 | Lux et al. | 340/146.3 AG |
| 4,360,195 | 11/1982 | Schon et al. | 271/3 |
| 4,365,304 | 12/1982 | Ruhman et al. | 364/515 |
| 4,381,447 | 4/1983 | Horvath et al. | 250/223 R |
| 4,399,468 | 8/1983 | Mizuno | 358/280 |
| 4,433,909 | 2/1984 | Goes in Center et al. | 355/75 |
| 4,438,917 | 3/1984 | Janssen et al. | 271/227 |
| 4,455,018 | 6/1984 | Colglazier et al. | 271/227 |
| 4,474,454 | 10/1984 | Sugiura | 355/14 R |
| 4,504,916 | 3/1985 | Oka | 364/471 |
| 4,504,961 | 3/1985 | Horiguchi | 377/8 |

FOREIGN PATENT DOCUMENTS 2066949 7/1981 United Kingdom .

*Primary Examiner*—James D. Thomas
*Assistant Examiner*—A. E. Williams, Jr.
*Attorney, Agent, or Firm*—Pollock, Vande Sande & Priddy

[57] ABSTRACT

An apparatus for monitoring automatically plural sheets of printed papers, includes a plurality of photosensors placed across the printed papers' moving direction for scanning and detecting a printed surface of each printed paper to produce analog signals designating dark levels of the printed surface thereof when each of the printed papers is being transferred, an AD converter for converting the analog signals into digital signals at a plurality of sampling points, a standard memory for storing such digital signals, a plurality of monitoring memories for storing such digital signals, circuitry for comparing the digital signals of the standard memory with the digital signals of the monitoring memories at the corresponding sampling points to decide whether or not the digital signals of the monitoring memories are within a tolerance range of the digital signals of the standard memory so that either "NO" signals or "YES" signals are produced, circuitry for counting only such "NO" signals to produce an "irregular" or "non-identity" signal when the number of such "NO" signals sums to a predetermined value, and circuitry for electrically compensating shifting of the papers when the digital signals of the standard memory are compared with the digital signals of the monitoring memories.

12 Claims, 20 Drawing Figures

PHOTO-ELECTRIC APPARATUS FOR MONITORING PRINTED PAPERS

FIELD OF THE INVENTION

This invention relates to an apparatus for monitoring printed papers. Particularly, this invention can be applied to a paper-printing machine, paper-folding machine or collator, bookbinding machine or a combination thereof.

DESCRIPTION OF THE PRIOR ART

The prior art includes an apparatus which comprises a plurality of photo sensors for monitoring a printed surface of each printed paper to produce analog signals designating dark levels of the printed surface thereof and an AD converter for converting said analog signals into monitored digital signals at a plurality of sampling points. A standard memory stores standard digital signals for a standard position of said paper sheets and a monitoring memory means stores said monitored digital signal. Means are provided for comparing the digital signals of the standard memory with the digital signals of the monitoring memory at the corresponding sampling points to decide whether or not the digital signals of the monitoring memory are within a tolerance range of the digital signals of the standard memory, said means producing "NO" signals or "YES" signals depending on the comparison results. As soon as a "NO" signals is developed, an error signal is outputted. In practice this method leads to a high number of unnecessary error signals, especially when the paper sheets are shifted from a standard position.

The number of unnecessary error signals is decreased with the apparatus as described in European Pat. No. EP-A-0,012,723. That prior art apparatus uses not only one upper threshold and one lower threshold when comparing the standard signals with the monitored signals, but it uses many thresholds, one upper and one lower threshold for each monitored point. When the monitored signal exceeds one of the thresholds, a "NO" signal is produced. The apparatus is additionally provided with a means for determining position deviations between a standard position and an actual position. The apparatus as known from the mentioned European patent provides fewer error signals than another prior art apparatus described in Britiseh Pat. No. GB-A-2,066,949. However, the method for determining the upper and the lower thresholds for each sampled point is very complicated. An error signal is provided as soon as only one single monitored signal exceeds one of the threshold levels.

SUMMARY OF THE INVENTION

It is an object of the present invention to provide an apparatus for monitoring printed paper which produces fewer error signals than previous apparatus and which has a simple construction.

The inventive apparatus makes use of the features as described in connection with the mentioned British patent, and additionally it is provided with means for counting only the "NO" signals of different positions of the printed surface and for only producing a "non-identity" signal after a certain number of "NO" signals have been received, and means for compensated shifting of paper out of the standard position when comparing the digital signals stored in said standard memory and said monitoring memory means, respectively.

The inventive apparatus does not produce an error or "non-identity" signal as soon as a threshold for only one sampling point is exceeded, but it produces such a signal only when a predetermined number of "NO" signals has been received. This leads to the result of a low number of wrong "non-identity" signals.

BRIEF DESCRIPTION OF THE DRAWINGS

The invention will be explained with reference to the accompanying drawings in which.

DETAILED DESCRIPTION OF THE INVENTION

Figure 1:
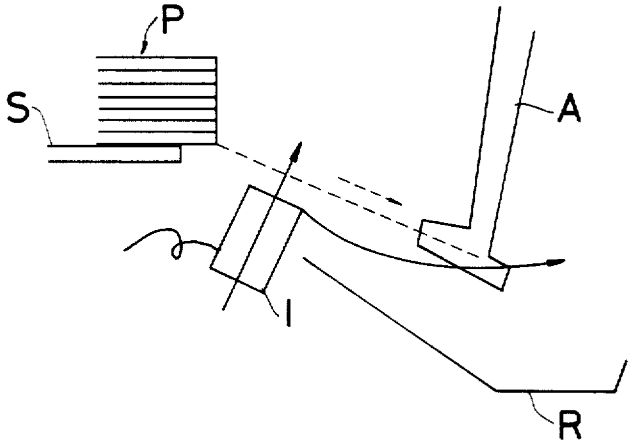
FIG. 1 shows schematically a portion of a paper-folding machine in which a monitoring apparatus according to this invention is used.

Referring to the drawings, preferred embodiments of this invention will be explained.

In FIG. 1, a stack of printed papers P are supported by a support member S of a paper-folding machine or bookbinding machine. In a well-known manner, each of the printed papers P is folded as a unit for several pages of a book or magazine. A swinging gripper arm A is used to catch at its tip portion and convey a sheet of folded paper P at the lowermost position from the support member S to a receiver R while it goes over a sensor or sensors 1. The sensor 1 can be attached to the support member S. When the paper moves over the sensor 1, it is scaned and detected by the sensor or sensors 1 in order that it is decided to be identical or not to be identical in comparison with a standard paper. For instance, 200,000 sheets of folded papers can be checked per hour.

Figure 2:
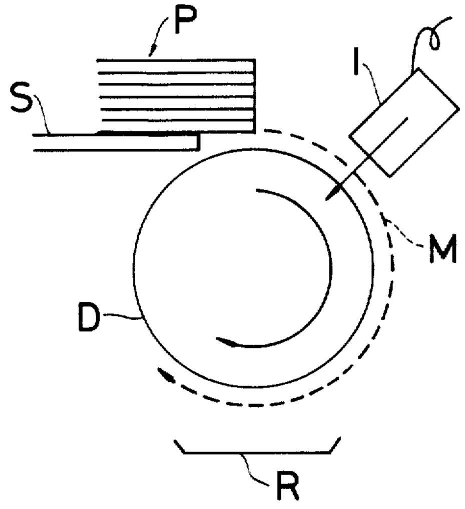
FIG. 2 shows partially another paper-folding machine according to this invention.

In FIG. 2, a stack of folded papers P are supported by the support member S. A sheet of folded paper at the lowermost position is supplied to the receiver R by means of a rotary drum D. When the paper moves along the arrow M, the sensor 1 scans and detects the paper so as to monitor it.

Figure 3:
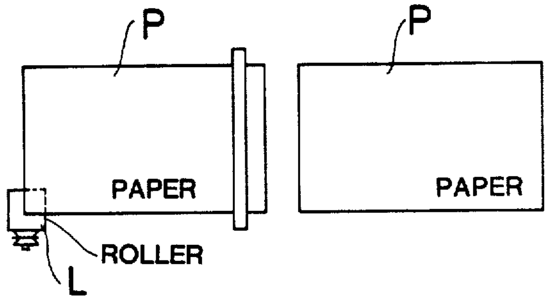
FIG. 3 shows a portion of a bookbinding machine in which an apparatus of this invention is employed.

In FIG. 3, a sheet of paper P which has been printed is supplied by means of a roller L to a conveyor (not shown) of an automatic printing and bookbinding machine in such a way that the paper P can be scanned and detected by a series of sensors 1 in order that it is checked whether or not the detected paper has a good quality in view of irregular printing, stains or the like.

Referring to FIGS. 4A through 4E, letters V, pictures or the like are printed on a sheet of paper P. While the paper P moves over the sensor 1, the printed surface of the paper P is scaned and detected by a sensor 1. A detected portion of the paper P is shown by the hatchings in FIG. 4A.

Figure 4A:
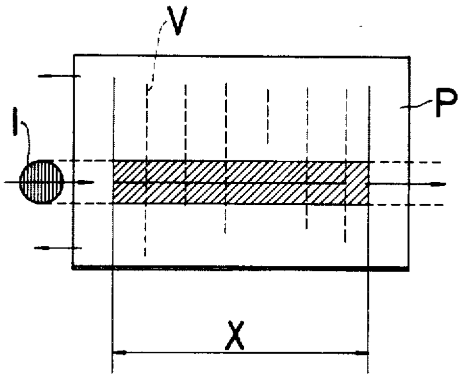
FIGS. 4A through 4E shows a principle of a monitoring apparatus according to this invention.
Figure 4B:
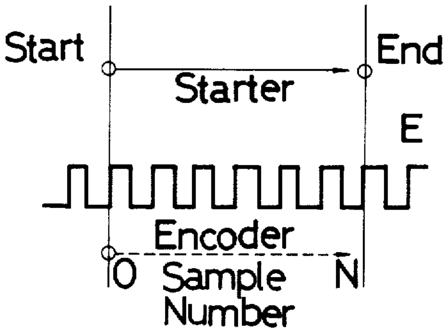

In FIG. 4B, an encoder 4 (FIG. 5) produces pulse signals E for the purpose of sampling, for instance, in proportion to the rotation angles of a driving shaft of a collator. The number of sampling points is predetermined in view of a size of the paper to be monitored thereby to set a detecting range or width X.

When the paper P comes to a predetermined position, a starter 3(FIG. 5) starts at the start point of the detecting range X. The starter 3 stops at the end of the detecting range X.

Figure 4C:
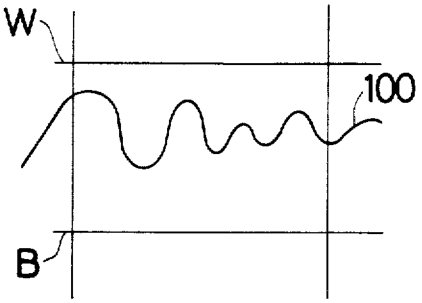

While the sensor 1 scans and detects the paper P within the detecting range X, detected analog signals 100 are obtained as shown in FIG. 4C. W designates the white level at which the paper P is completely white, and B designates the black level at which the paper is completely black.

Figure 4D:
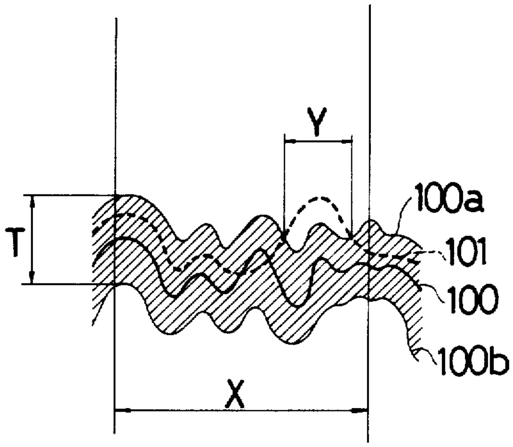
Figure 4E:
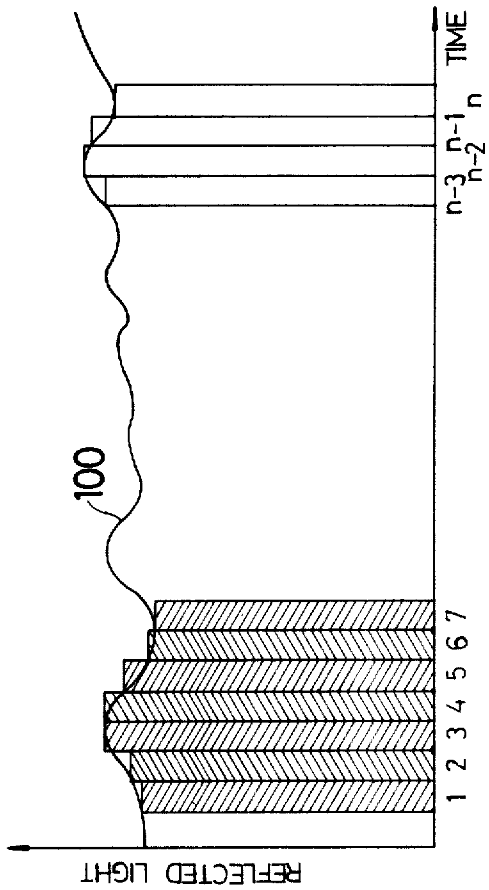
Figure 5:
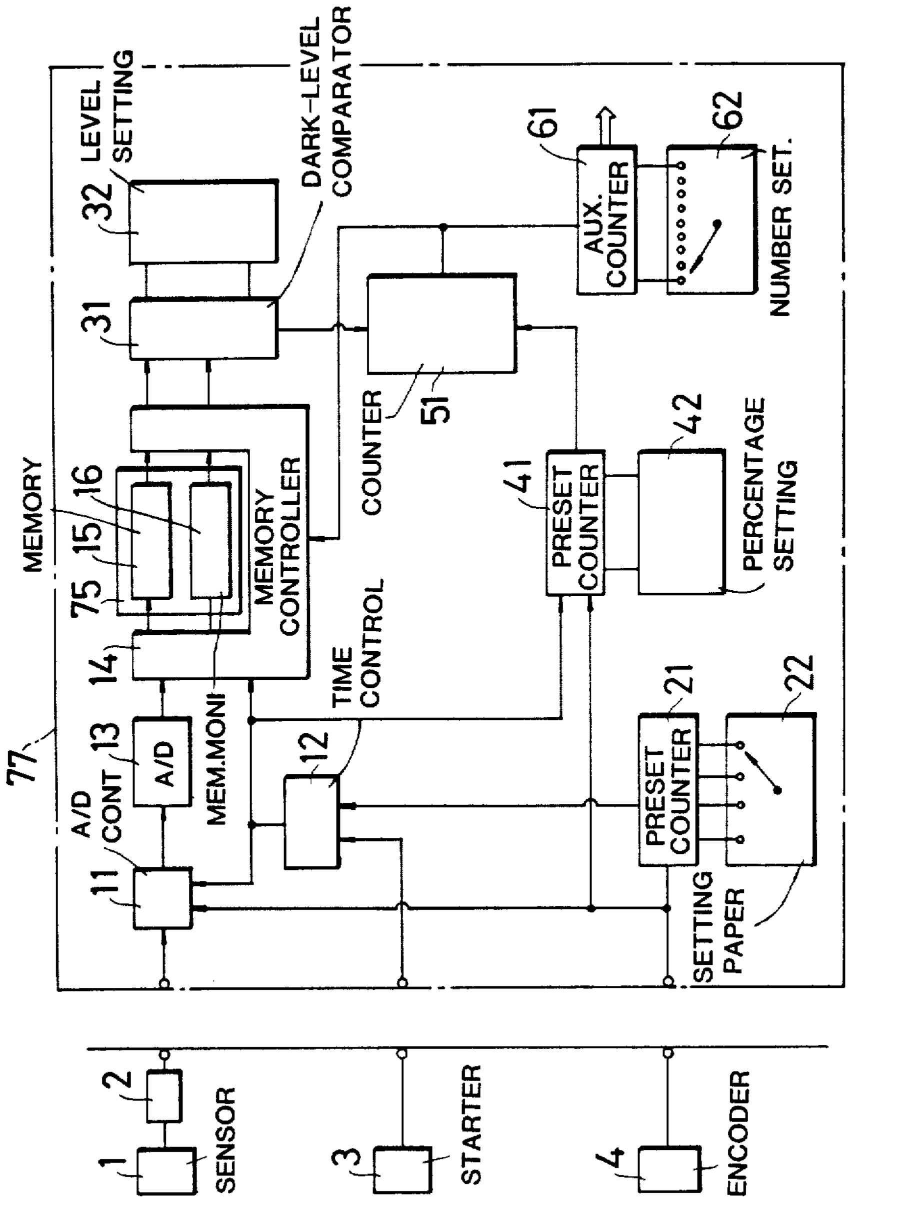
FIG. 5 is a diagram showing a paper-monitoring apparatus according to this invention.

As shown in FIG. 4E, such detected analog signals 100 are converted into digital signals by means of an AD converter 13 (FIG. 5). Such digital signals are stored as first standard signals.

As shown in FIGS. 4D and 4E, second analog signals 101 are detected in the same manner and converted into digital signals concerning the next paper so as to be compared with the first standard digital signals at each corresponding sampling points from zero to N(FIG. 4B). The reference **100*a* designates the tolerance upper limit for the first standard signals 100, and the reference 100*b* designates the tolerance lower limit for the same. A tolerance range T is defined between the upper limit 100*a* and the lower limit 100*b***. Such a tolerance range T can be adjusted according to types of printed papers, accuracy, kind of printing or other criteria.

Whenever the second digital signals 101 are decided to be positioned out of the tolerance range T at the sampling points within the range Y in FIG. 4D, then a "NO" signal is produced. Otherwise, a "YES" signal is produced. When such "NO" signals sum to a predetermined value, the paper which has been detected is decided to be irregular or not to be identical. If the total number of the "NO" signals is less than such a predetermined value, then the paper is decided to be regular or to be identical to the previously handled paper.

The second digital signals are stored as second standard signals for the third paper to be detected so that the first standard signals are automatically renewed. In another mode of this invention, the first standard signals can be used as a common standard for all following detected signals.

Referring to FIG. 5, the sensor 1 is connected by way of an amplifier 2 to a CPU 77. The ampifier 2 is preferably a buffer amplifier for impedance transformation because thereby noise or the like can be prevented from entering into the detected signals. The detected analog signals are amplified by the amplifier 2 and thereafter sent by way of an AD controller 11 to the AD converter 13 in which the analog signals are converted into the digital signals as shown in FIG. 4E at the sampling points. The AD controller 11 is connected to a detecting-time controller 12 so that the detected analog signals are sampled at desired intervals upon receipt of the detecting signals from the detecting-time controller 12 and thereafter sent to the AD converter 13. The detecting-time controller 12 is actuated in response to the pulse signals from a starter 3. The starter 3 may be attached to a driving shaft of a paper-folding machine or a paper-printing machine, for example. When a sheet of paper begins to be transferred by the swinging gripper arm A(FIG. 1), the rotary drum D(FIG. 2) or the roller L(FIG. 3), the starter 3 starts to produce pulse signals.

Sampling is carried out by a time-division method upon receipt of pulse signals from the encoder 4. The encoder 4 may be attached to the driving shaft of a paper-folding machine or paper printing machine so that pulse signals can be produced in proportion to the operation speed of such a machine. For instance, 1024 pulses can be produced per one rotation of the driving shaft.

The above-stated digital signals at many sampling points are stored in a memory 75 according to the instructions of a memory controller 14. The memory 75 essentially consists of a standard memory 15 and a monitoring memory 16. The monitoring memory 16 consists of plural memories as later described.

Stored in the standard memory 15 are informations or signals concerning a standard paper. Stored in the monitoring memory 16 are informations or signals concerning a following paper or papers to be detected. Digital signals are obtained at many sampling points such as 100, 200 or 400 points in view of a size of paper or other factors and stored in the standard or monitoring memories.

A dark-level comparator 31 compares the digital signals of the monitoring memory 16 with the digital signals of the standard memory 15. Whenever a difference between the digital signals of these memories 15 and 16 at each sampling point is larger than the above-stated range T, the signal "NO" is produced by the dark-level comparator 31. The range T can be adjusted by a level setting means 32, for instance, by taking into consideration types and kinds of letters or pictures printed on the papers to be detected.

A counter 51 counts only "NO" signals sent from the comparator 31.

The detecting-time controller 12 is used to stop the AD controller upon receipt of a detection-end pulse signal from a preset counter 21. The preset counter 21 counts the number of pulse signals sent from the encoder 4 thereby to send such a detection-end pulse signal to the detecting-time controller 12 according to a setpoint of a paper-size setting means 22. For example, when the swinging gripper arm A(FIG. 1) moves from the support A to the receiver R, the encoder 4 produces 512 pulses. It is preferable that the paper-size setting means 22 sets "400 pulses" in case of A-4 size paper, "200 pulses" in case of A-5 size paper, and "100 pulses" in case of A-6 size paper. The preset counter 21 sends a detection-end signal to the detecting-time controller 12 on the basis of such a set pulse-number thereby to stop the operation of the AD controller 11.

The number of "NO" signals is stored in the counter 51. If such number of "NO" signals is larger than a predetermined value, then the paper is decided not to be identical or to be irregular.

A preset counter 41 counts the pulse signals coming from the encoder 4 during a detecting period so as to store therein the total number of sampling points. A percentage-setting means 42 presets a proper rate of "NO" signals to all detected signals. For example, if the percentage-setting means 42 sets 20% in case of A-4 size paper, the limit number of "NO" signals is 80 because the sampling points are 400. Thus, the limit-number signal of "80" is sent to the counter 51. Such limit-number is compared with the stored number of the "NO" signals by means of the counter 51 in order to decide whether or not the detected paper is identical or irregular. If the counter 51 produces an "irregular" or "non-identity" signal, then such a signal can be further sent to an auxiliary counter 61 to count the total number of "irregular" or "non-identity" signals continuously sent from the counter 51. Number-setting means 62 is used to actuate the auxiliary counter 61 when a predetermined number of "irregular" or "non-identity" signals are sent from the counter 51 to the auxiliary counter 61. For instance, assuming that the number-setting means 62 is set at "3", when three sheets of paper are continuously detected not to be identical or regular so that three "irregular" or "non-identity" signals are sent to the auxiliary counter 61, the detected papers are finally decided to be not identical or regular. Such final decision signal will be sent to an alarm device (not shown) so as to inform an operator of it and/or to stop a machine.

Figure 12:
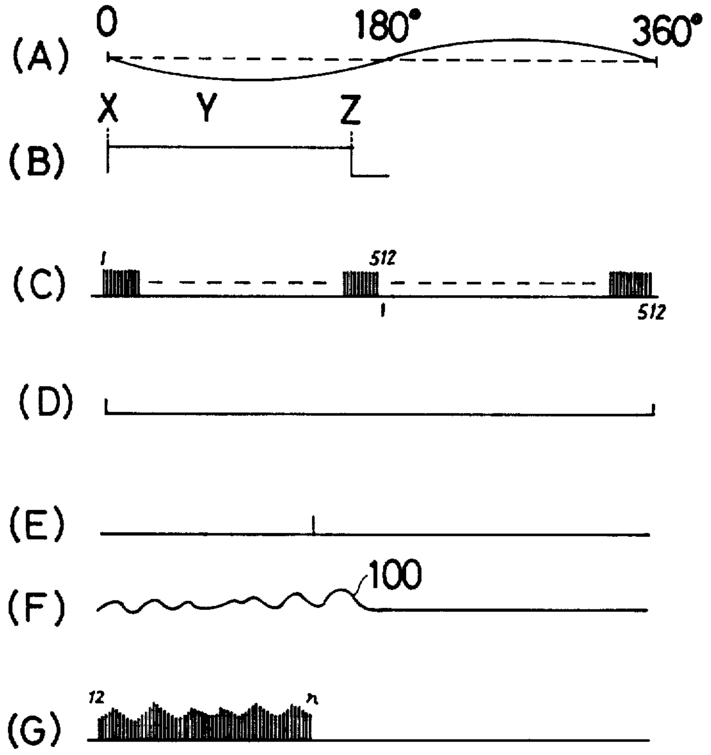
FIG. 12 shows timing of several elements used in a paper monitoring apparatus according to this invention.

Referring to FIG. 12, FIG. 12(A) shows a full rotation of a driving shaft of a paper-folding machine. FIG. 12(B) shows how a folded sheet of paper moves. The swinging gripper arm A(FIG. 1) catches the folded paper P at the point X and transfers it during the operation Y to a conveyor (not shown) positioned at the point Z. FIG. 12(C) shows an example of pulse signals produced by the encoder 4(FIG. 5). FIG. 12(D) shows an example of pulse signals from the starter 3. FIG. 12(E) shows an example of output signals of the preset counter 21. FIG. 12(F) shows an example of the output signals from a sensor or sensors 1. FIG. 12(G) shows an example of output signals from the AD controller 11.

In practice, some sheets of paper do not move exactly in a given route when detected by the sensor or sensors 1. Some papers slightly get out of position when moving over the sensor 1. In such cases, detected signals need to be compensated or adjusted so that the detected papers can be correctly monitored.

Figure 6:
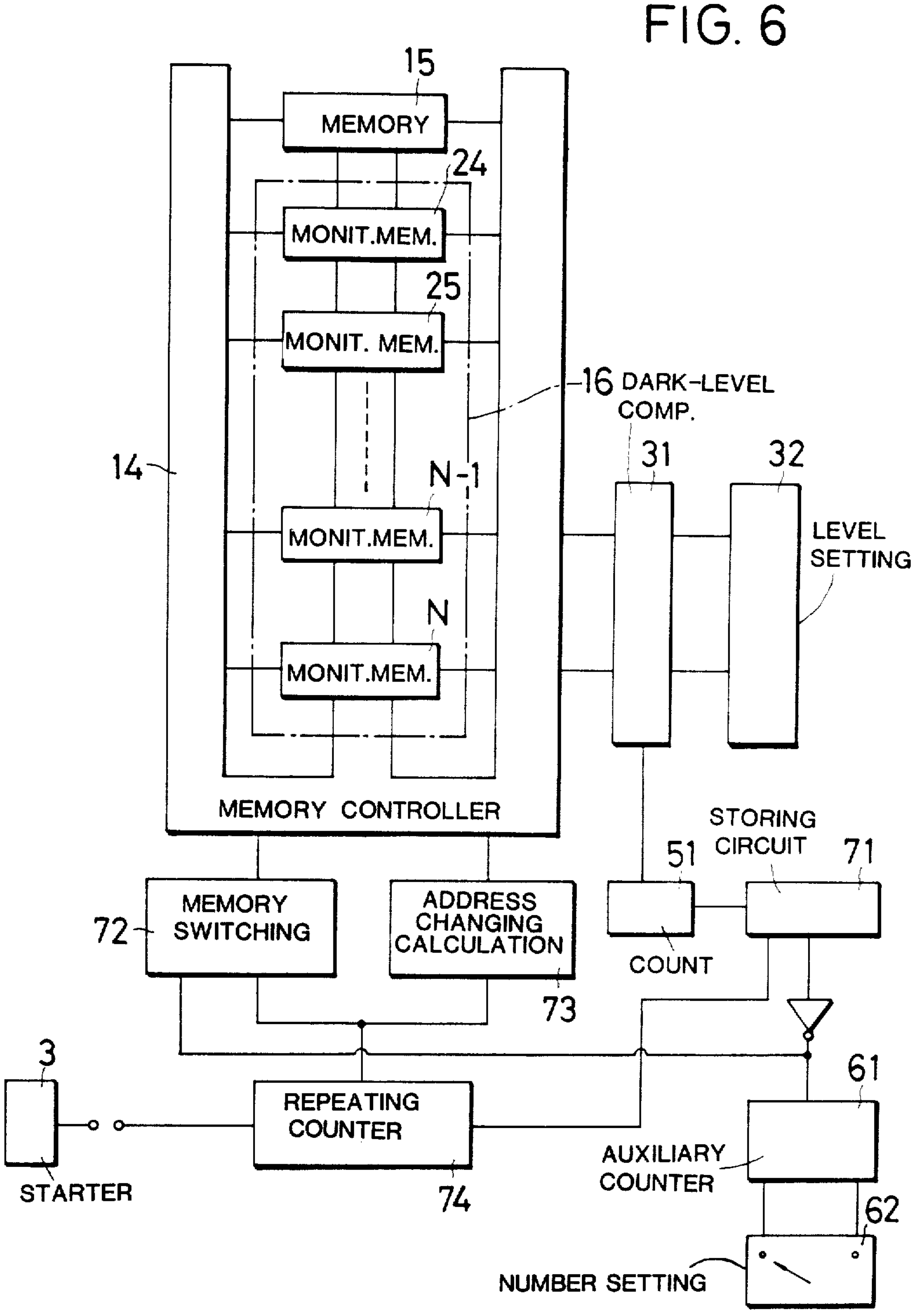
FIG. 6 is a diagram showing in detail a part of the embodiment shown in FIG. 5.

FIG. 6 shows a monitoring apparatus as shown in FIG. 5 and particularly the memory 15 in detail in which such compensation is possible. The memory 75 is designed such that shifting of a paper can be electrically adjusted or compensated in a lateral direction perpendicular to the moving direction of the paper.

For instance, the memory 75 consists of one standard memory 15 and five monitoring memories 24 to N(28).

Shifting of a paper in a lateral direction can be electrically compensated as follows: Five sensors 1 are arranged at the same intervals across the paper's moving direction. One of the five sensors scans and detects a first paper, and such detected analog signals are converted into digital signals to be stored in the standard memory 15. Thereafter, the five sensors detect a second paper at the same time, and such detected analog signals are converted into the digital signals to be stored in the monitoring memories 24–28, respectively. The digital signals of the standard memory 15 are compared with the digital signals of the monitoring memories 24, 25, 26, 27 and 28 by means of the dark-level comparator 31.

Shifting of a paper along the moving direction thereof can be electrically compensated or adjusted as follows: The stored digital signals of the standard memory 15 are compared with the address signals of the monitoring memory 24 plus the constant K. Also, each address signals of the monitoring memories 25, 26, 27 and 28 plus the constant K are compared with the stored signals of the standard memory 15. Further, each address signals of the monitoring memories 24, 25, 26, 27 and 28 minus the constant K are compared with the stored signals of the standard memory 15.

The dark-level comparator 31 sends its output signals by way of the counter 51 to a storing circuit 71 thereby to decide whether or not the detected paper is regular or identical.

Such operational steps are carried out by a memory-switching circuit 72, an address-changing calculation circuit 73 and a repeating-time counter 74.

Also, the monitoring accuracy can be improved if the memory 75 is controlled as follows: Assuming that the detected paper is decided to be identical or regular because the stored signals of the standard memory 15 are the same as those of one memory 25 of the monitoring memory 16, the memory controller 14 cancels all stored signals of the other memories 24, 26, 27, 28 of the monitoring memory 16 and only the signals of the memory 25 are stored to be used as a fresh standard for the next paper. In such a case, electrical drift, change of inks or the like can be ignored.

Figure 7:
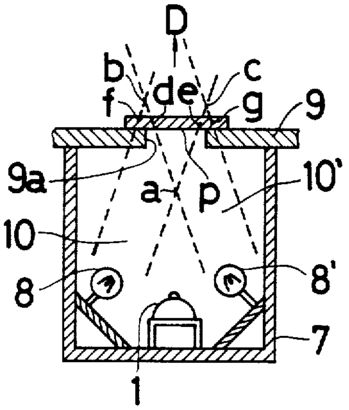
FIG. 7 is a sectional view showing a light mechanism used in a paper-monitoring apparatus according to this invention.

FIG. 7 shows a light mechanism in which shifting of a paper in a vertical direction can be compensated so that a distance between the paper and a sensor can be reasonably ignored.

A photosensor 1 is placed at a central portion of the bottom of a rectangular casing 7. A pair of light sources such as lamps 8, 8' are arranged in a lower portion of the casing 7 to produce the same bright rays or light toward a central portion of the top of the casing 7. The photosensor 1 is placed at the exact intermediate position between the pair of lamps 8, 8'. A guide plate 9 is fixed to the top of the casing 7 and has a rectangular opening 9*a* at a central portion of the casing 7. A sheet of paper P to be detected is guided by the guide plate 9 while it is moved over the photosensor 1. The light or rays produced by the pair of lamps 8, 8' go through the opening 9*a* of the guide plate 9 and are reflected by the paper P toward the photosensor 1. The parallel light flux 10 of the lamp 8 intersects the parallel light flux 10' of the lamp 8' at the lines a, b, c and others. Such an intersecting portion of the two light fluxes 10, 10' has double brightness. That is, the brightness is double within the area between the lines d and e on the paper P as compared with the other area between the areas f and g. Assuming that the paper P shifts downwardly or in the direction D, the double-brightness area d-e on the paper increases up to the plane b-c. Thus, decreasing of the brightness due to increasing of distance between the lamps and the paper can be substantially compensated or adjusted.

Such a pair of lamps 8, 8' can be replaced by a ring-shaped lamp which can produce a ring-shaped light flux toward the paper to be detected.

Figure 8:
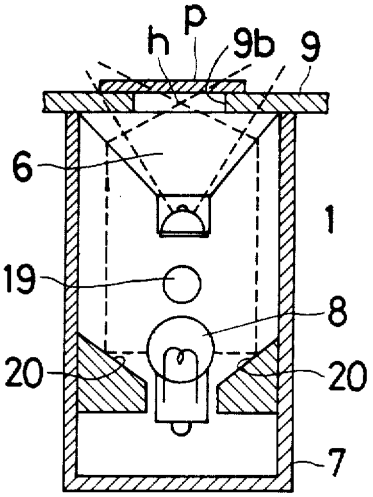
FIG. 8 is a sectional view showing another light mechanism used in a paper-monitoring apparatus according to this invention.

FIG. 8 shows another light mechanism in which a similar compensation of brightness is possible. A lamp 8 is placed in a lower portion of a cylindrical casing 7 at the center thereof. A reflecting surface 20 is formed around the lamp 8 to reflect the light upwardly as a ring-shaped light flux. A dome-shaped prism 6 is attached to the underside of the guide plate 9 fixed at the top of the casing 7. The photosensor 1 is attached to the bottom center of the prism 6 to receive the rays or light reflected from the paper P through a circular opening 9*b* of the guide plate 9. The reference 19 designates a thermistor.

The ring-shaped light flux is focused at the focal point h in front of the paper P. As the paper upwardly shifts away from the guide plate 9, the brightness of the light or rays reflected from the paper P increases. Thus, the brightness of the light which affects the photosensor 1 is compensated.

Figure 9:
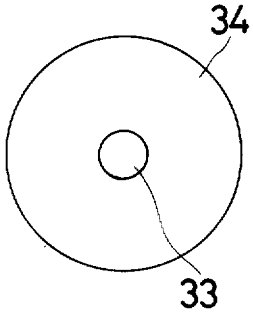
FIG. 9 is a plan view showing two bright areas on the paper shown in FIG. 8.
Figure 10:
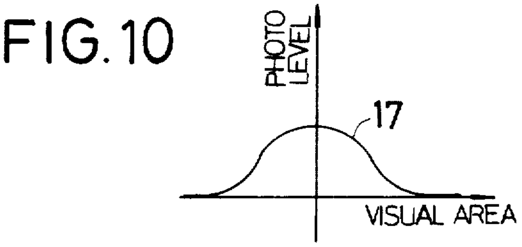
FIG. 10 shows a sensitivity of a photosensor.
Figure 11:
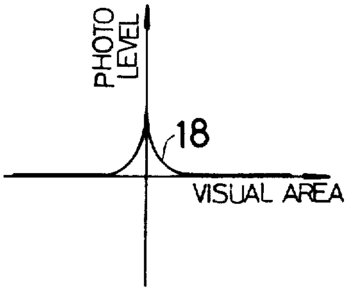
FIG. 11 shows a further sensitivity of another photosensor.

FIG. 9 shows two bright areas 33 and 34 on the paper P of FIG. 8. The area 33 is brighter than the area 34. As well-known, the photosensor 1 is highly sensitive at its central portion. Thus, the light mechanism as shown in FIG. 8 is preferable as regards the sensor's sensitivity. In general, FIG. 11 shows a preferable relationship between photo-level and visual area of a photosensor as compared with that of FIG. 10. A combination of the light mechanism in FIG. 8 and the photosensor's sensitivity in FIG. 11 is best.

Figure 13:
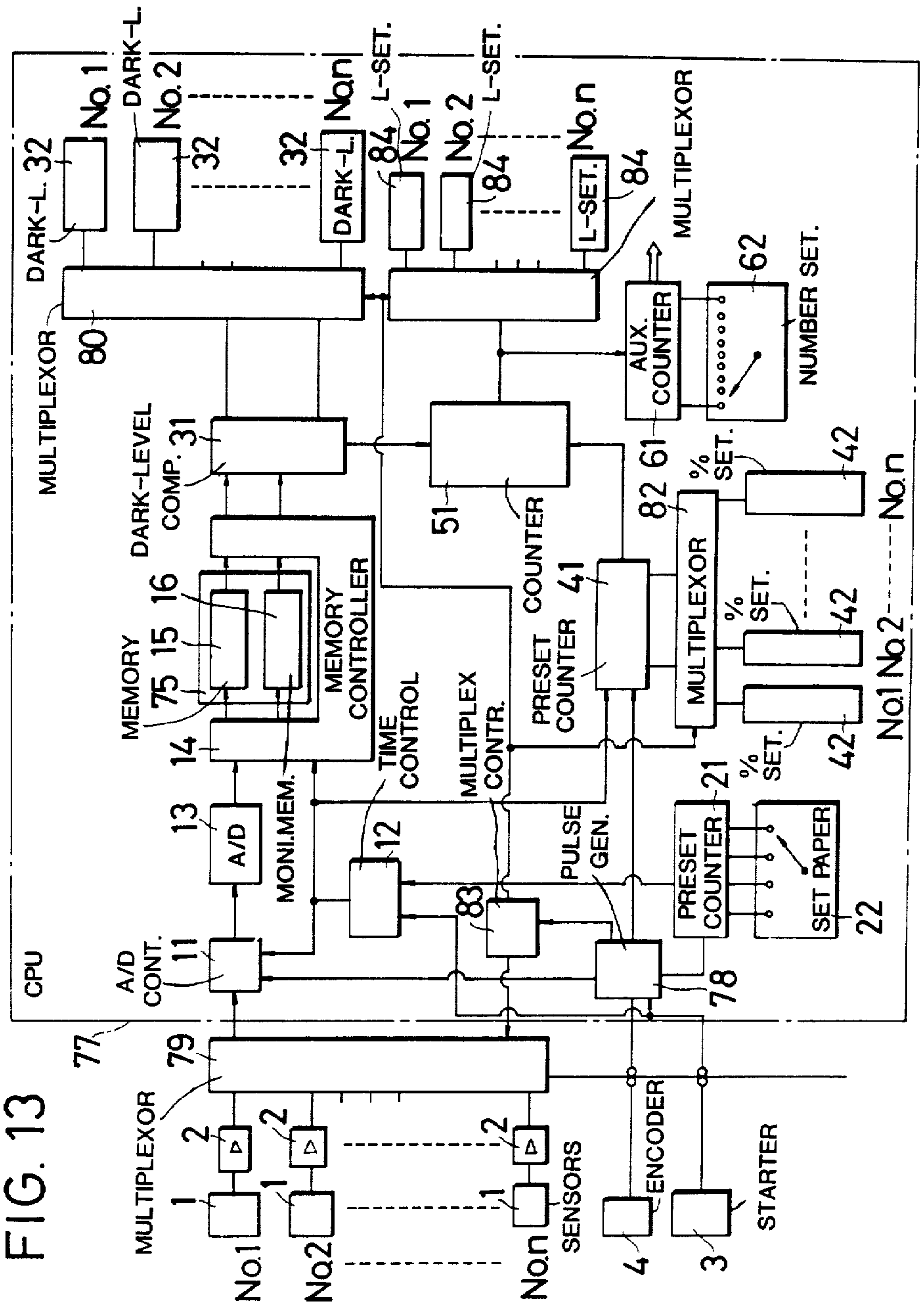
FIG. 13 is a diagram showing an apparatus of monitoring printed papers according to this invention.

FIG. 13 shows a further embodiment of this invention. One CPU 77' controls a plurality of collators or printing machines. Plural sensors 1 (No.1 to No.n) are attached to driving shafts of the machines and connected to plural amplifiers 2, respectively, which are connected through a common multiplexor 79 to the CPU 77'. Also, a multiplexer 80 is disposed between the dark-level comparator 31 and plural level-setting means 32 (No. 1 to No. n), a multiplexor 81 between the counter 51 and plural alarm devices 84 (No. 1 to No.n), and a multiplexor 82 between the preset counter 41 and plural percentage-setting means 42 (No.1 to No.n). A 1/n-pulse generator 78 receives pulse signals from the encoder 4 in response to start signals from the starter 3 and generates 1/n-pulse signals so as to send them to the AD controller 11, the preset counter 41 and a multiplexor controller 83. Upon receipt of 1/n-pulse signals, the multiplexor controller 83 controls the multiplexors 79-82. Except such multiplexors 79-82 and the related elements thereof, the CPU 77' functions as in the CPU 77.

Figure 14:
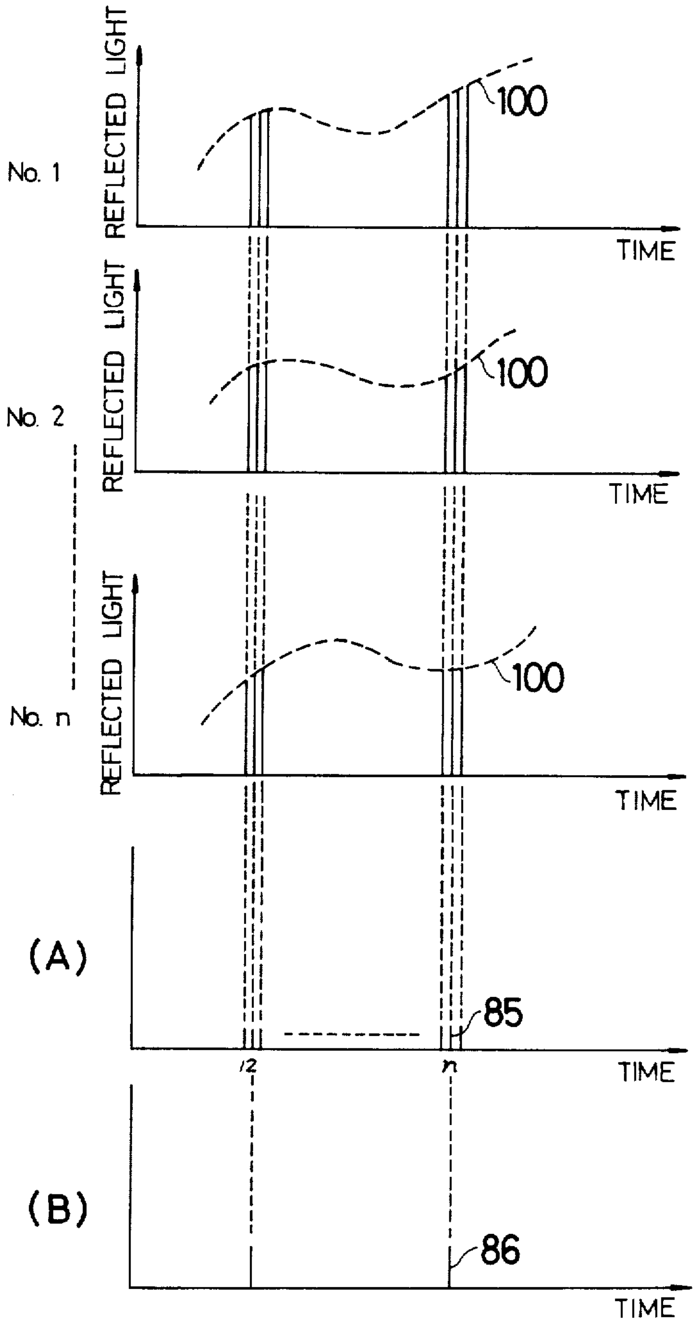
FIG. 14 shows timing of several signals produced in the paper-monitoring apparatus shown in FIG. 13.

Referring to FIG. 14, the operation of the multiplexor 79 will be explained. No.1 through No.n show examples of output signals 100 produced by the plural sensors 1 (No.1 to No.n), respectively. (A) shows pulse signals from the 1/n-pulse generator 78, and (B) shows pulse signals from the encoder 4. The multiplexor 79 divides the output signals 100 in synchronized relationship to the pulse signals from the 1/n-pulse generator 78 and send such divided signals to the AD controller 11. For instance, the 1/n-pulse generator 78 generates the pulse signal 85 of No.n. At the same time, the encoder 4 produces the pulse signal 86. Thereafter, the same operation is repeated. The analog signals of No. 1 to No. n are in order sent to the AD controller 11.

Figure 15:
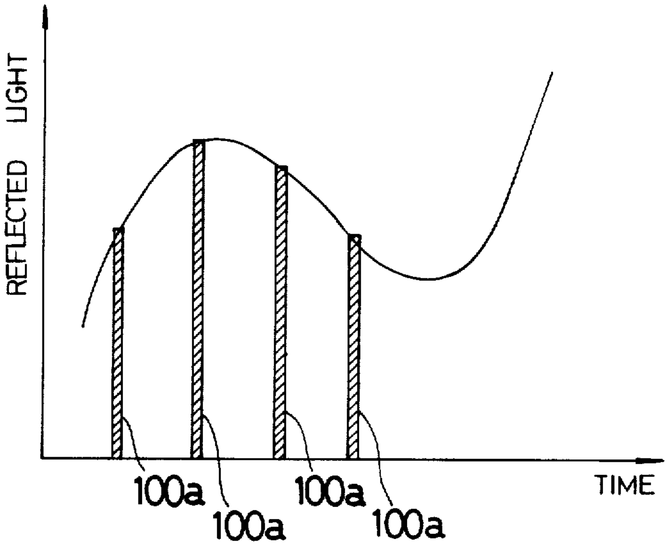
FIG. 15 is an enlarged view showing detected signals according to this invention.

FIG. 15 shows a condition in which output analog signals 100 of the sensor 1 are amplified, sampled and then converted into the digital signals 100*a* which are separate from each other and have the same cycle as that of the pulse signals from the encoder 4 and the same width as that of the pulse signals from the 1/n-pulse generator 78.

Figure 16:
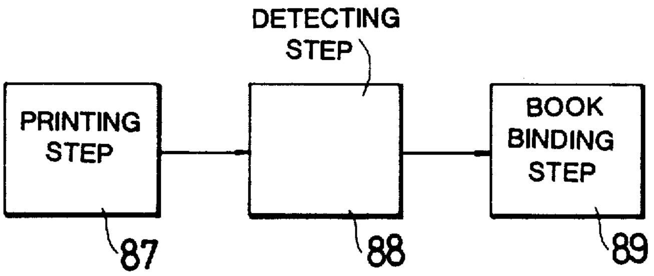
FIG. 16 is a diagram showing a bookbinding machine according to this invention.

FIG. 16 shows a block diagram of a bookbinding machine. A printing step 87, a paper-monitoring (detecting) step 88 and a bookbinding step 89 can be continuous as one unit. For instance, many sheets of paper are printed at the printing step 87, and thereafter automatically monitored or detected at the detecting step 88. In a well-known manner, such detected papers are folded thereby to become a folded sheet of paper. Such plural folded sheets of paper are bookbound in order to constitute a book. In another mode, after the printed papers are folded, they are automatically monitored or detected and then bookbound. In these cases, the sensor or sensors 1 can be placed as shown in FIG. 3.

What is claimed is:

1. An apparatus for automatically monitoring plural sheets of printed papers, comprising:

- a plurality of photosensors for detecting a printed surface of each printed paper to produce analog signals designating dark levels of the printed surface thereof;
- an analog-digital (A-D) converter for converting the analog signals into digital signals at a plurality of sampling points;
- first memory means for storing digital signals received from said A-D converter during first time frames;
- second memory means for storing digital signals received from said A-D converter during subsequent second time frames;
- means for comparing the digital signals of the first and second memory means, for corresponding sampling points, to determine whether the digital signals of the second memory means are within a tolerance range of the digital signals established in the first memory means so that either "NO" signals or "YES" signals are produced;
- means counting only the "NO" signals of different positions of the printed surface for producing only "irregular" or "non-identity" signals after a predetermined number of "NO" signals has been received; and
- means for compensating errors which occur while producing said digital NO signals due to displacement of the paper from a standard position while said paper is monitored by said photosensors.

2. An apparatus as defined in claim 1, wherein the photosensors are positioned at equal intervals across the full width of the papers to be detected.

3. An apparatus as defined in claim 1, wherein the photosensors are placed across the printed papers' moving direction so as to scan the printed surface of each printed paper while being transferred.

4. An apparatus as defined in claim 3, wherein the printed papers are detected by the photosensors before they are folded.

5. An apparatus as defined in claim 3, wherein the printed papers are detected after they are folded and before they are bookbound.

6. An apparatus as defined in claim 1, wherein the photosensors are positioned at equal intervals across the width of the papers to be detected, and wherein one of the plural monitoring photosensors scans and detects a first paper so that such detected signals are converted into digital signals by the converting means and thereafter stored in the first memory means, and wherein all plural photosensors detect, at the same time, a following paper so that such detected signals are converted into digital signals and thereafter stored in the second memory means, the apparatus further comprising a dark-level comparator for comparing the digital signals of the first memory means with each digital signals of the second memory means at the corresponding sampling points.

7. An apparatus as defined in claim 6, wherein the dark-level comparator compares the digital signals of the first memory means with the address of each digital signal of the second memory means plus a constant, and wherein the dark-level comparator compares the digital signals of the first memory means with the address of each digital signal of the second memory means minus the constant.

8. An apparatus as defined in claim 6 further comprising means for restoring the digital signals of the first memory means when they are compared with the digital signals of the second memory means.

9. An apparatus as defined in claims 1 or 8 wherein the compensating means includes optical means for compensating decreased brightness due to increasing of distance between the photosensors and the detected papers so that shifting of the detected papers can be compensated.

10. An apparatus as defined in claim 1, further comprising a multiplexer for dividing the signals detected by the photosensors in synchronized relationship to pulse signals from a 1/n-pulse generator and sending such divided signals to an analog-digital controller controlling the analog-digital converter.

11. An apparatus as claimed in claim 1 wherein said compensating means includes an optical compensating means and an electrical compensating means.

12. An apparatus as claimed in claim 11, in which said optical compensating means is provided in cooperation with the photosensors.

* * * * *